United States Patent
Strosaker

(10) Patent No.: US 9,250,895 B2
(45) Date of Patent: Feb. 2, 2016

(54) ESTABLISHING SUBSYSTEM BOUNDARIES BASED ON CALL FLOW GRAPH TOPOLOGY

(71) Applicant: International Business Machines Corporation, Armonk, NY (US)

(72) Inventor: Michael T. Strosaker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/312,726

(22) Filed: Jun. 24, 2014

(65) Prior Publication Data

US 2015/0370556 A1 Dec. 24, 2015

(51) Int. Cl.
G06F 9/44 (2006.01)
G06F 9/45 (2006.01)

(52) U.S. Cl.
CPC .......................................... *G06F 8/75* (2013.01)

(58) Field of Classification Search
CPC ............................................................ G06F 8/75
USPC .................. 717/120–123, 132, 133, 156, 157
See application file for complete search history.

(56) References Cited

U.S. PATENT DOCUMENTS

| | | | | |
|---|---|---|---|---|
| 5,457,799 A * | 10/1995 | Srivastava | | 717/160 |
| 5,787,284 A * | 7/1998 | Blainey et al. | | 717/144 |
| 5,797,012 A * | 8/1998 | Blainey et al. | | 717/152 |
| 6,029,004 A * | 2/2000 | Bortnikov et al. | | 717/158 |
| 6,163,882 A * | 12/2000 | Masuyama et al. | | 717/154 |
| 6,996,806 B2 * | 2/2006 | Bates et al. | | 717/125 |
| 7,290,070 B2 | 10/2007 | Brice, Jr. et al. | | |
| 7,739,653 B2 * | 6/2010 | Venolia | | 717/101 |
| 7,886,272 B1 | 2/2011 | Episkopos et al. | | |
| 8,375,374 B2 | 2/2013 | O'Brien et al. | | |
| 8,387,001 B2 * | 2/2013 | Sindhgatta et al. | | 717/105 |
| 8,438,427 B2 | 5/2013 | Beck et al. | | |
| 8,499,284 B2 * | 7/2013 | Pich et al. | | 717/120 |
| 8,694,979 B2 * | 4/2014 | Rosu et al. | | 717/156 |
| 8,694,980 B2 * | 4/2014 | Rosu et al. | | 717/156 |
| 2003/0061600 A1 * | 3/2003 | Bates et al. | | 717/133 |
| 2003/0176931 A1 * | 9/2003 | Pednault et al. | | 700/31 |
| 2005/0044538 A1 * | 2/2005 | Mantripragada | | 717/151 |
| 2007/0011659 A1 * | 1/2007 | Venolia | | 717/127 |
| 2010/0063785 A1 * | 3/2010 | Pich et al. | | 703/6 |
| 2010/0100867 A1 * | 4/2010 | Sindhgatta et al. | | 717/105 |
| 2011/0321021 A1 * | 12/2011 | Chen et al. | | 717/157 |
| 2012/0260133 A1 | 10/2012 | Beck et al. | | |
| 2012/0260236 A1 | 10/2012 | Basak et al. | | |
| 2013/0346467 A1 * | 12/2013 | Rosu et al. | | 709/201 |
| 2014/0067873 A1 * | 3/2014 | Rosu et al. | | 707/798 |

* cited by examiner

*Primary Examiner* — Qing Chen
(74) *Attorney, Agent, or Firm* — Scully, Scott, Murphy & Presser, P.C.

(57) ABSTRACT

According to one exemplary embodiment, a method for establishing subsystem boundaries is provided. The method may include receiving an input program having a plurality of subroutines and at least one inter-subroutine call. The method may include generating a graph having a plurality of nodes and at least one edge, wherein the at least one edge includes a first end connected to a first node and a second end connected to a second node. The method may include assigning an edge weight to the at least one edge wherein the edge weight is based on a number of second ends received by the second node. The method may include determining, based on the assigned edge weight, a distance value between each pair of nodes. The method may include generating a grouping of nodes based on the determined distance value between each pair of nodes.

15 Claims, 3 Drawing Sheets

ESTABLISHING SUBSYSTEM BOUNDARIES BASED ON CALL FLOW GRAPH TOPOLOGY

BACKGROUND

The present invention relates generally to the field of computing, and more particularly to program structure analysis.

Modern software development and maintenance may often require thoroughly understanding the overall program structure of individual programs. Complex program structures inherent to many large modern programs may not be accurately understood by software development and maintenance personnel.

SUMMARY

According to one exemplary embodiment, a method for establishing subsystem boundaries associated with a program is provided. The method may include receiving an input program having a plurality of subroutines and at least one inter-subroutine call. The method may also include generating a graph having a plurality of nodes and at least one edge connecting two nodes within the plurality of nodes, each node within the plurality of nodes corresponding with each subroutine within the plurality of subroutines and the at least one edge corresponding with the at least one inter-subroutine call, wherein the at least one edge includes a first end connected to a first node and a second end connected to a second node. The method may then include assigning an edge weight to the at least one edge wherein the edge weight is based on a number of second ends received by the second node. The method may further include determining, based on the assigned edge weight, a distance value between each pair of nodes within the plurality of nodes in the generated graph. The method may also include generating a grouping of nodes based on the determined distance value between each pair of nodes within the plurality of nodes.

According to another exemplary embodiment, a computer system for establishing subsystem boundaries associated with a program is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving an input program having a plurality of subroutines and at least one inter-subroutine call. The method may also include generating a graph having a plurality of nodes and at least one edge connecting two nodes within the plurality of nodes, each node within the plurality of nodes corresponding with each subroutine within the plurality of subroutines and the at least one edge corresponding with the at least one inter-subroutine call, wherein the at least one edge includes a first end connected to a first node and a second end connected to a second node. The method may then include assigning an edge weight to the at least one edge wherein the edge weight is based on a number of second ends received by the second node. The method may further include determining, based on the assigned edge weight, a distance value between each pair of nodes within the plurality of nodes in the generated graph. The method may also include generating a grouping of nodes based on the determined distance value between each pair of nodes within the plurality of nodes.

According to yet another exemplary embodiment, a computer program product for establishing subsystem boundaries associated with a program is provided. The computer program product may include one or more computer-readable storage devices and program instructions stored on at least one of the one or more tangible storage devices, the program instructions executable by a processor. The computer program product may include program instructions to receive an input program having a plurality of subroutines and at least one inter-subroutine call. The computer program product may also include program instructions to generate a graph having a plurality of nodes and at least one edge connecting two nodes within the plurality of nodes, each node within the plurality of nodes corresponding with each subroutine within the plurality of subroutines and the at least one edge corresponding with the at least one inter-subroutine call, wherein the at least one edge includes a first end connected to a first node and a second end connected to a second node. The computer program product may then include program instructions to assign an edge weight to the at least one edge wherein the edge weight is based on a number of second ends received by the second node. The computer program product may further include program instructions to determine, based on the assigned edge weight, a distance value between each pair of nodes within the plurality of nodes in the generated graph. The computer program product may also include program instructions to generate a grouping of nodes based on the determined distance value between each pair of nodes within the plurality of nodes.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
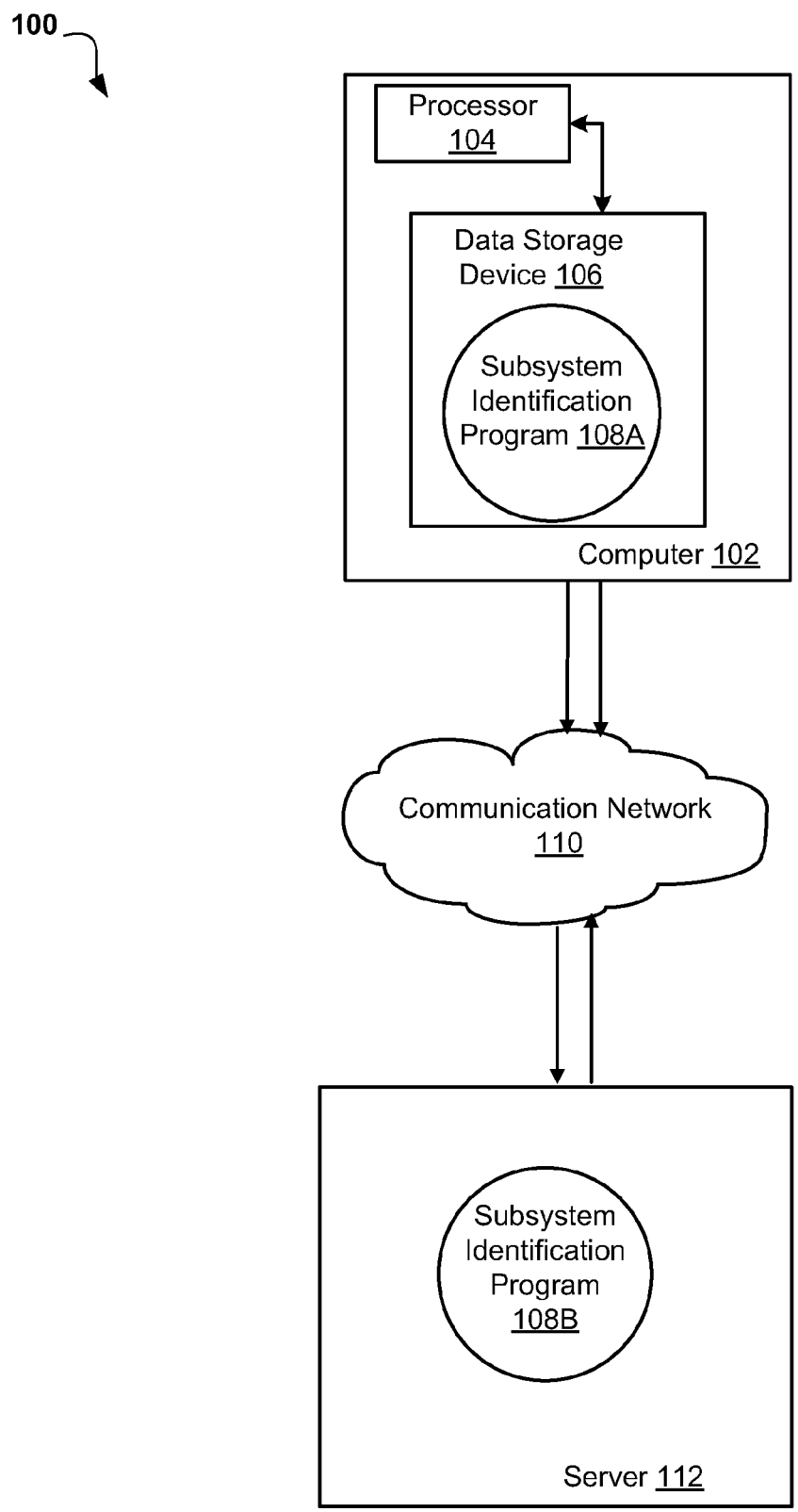
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for establishing program subsystem boundaries.

As described previously, modern programs may have complex structures that may be difficult or impractical for software developers and maintenance personnel to fully understand. It may be necessary, for example, for such personnel to understand a program's structure in order to debug the program or update the program with new capabilities. In some instances, software development and maintenance personnel may only have binary code to work from that may further inhibit understanding the program's structure clearly. One technique that may be employed by personnel to understand a program's structure may include dividing the program into subsystems comprising a cluster of related subroutines. In many instances, manually deciphering the subsystem structure of complex programs by service personnel may not be practical. Therefore, it may be advantageous to, among other things, have an automated method for establishing program subsystem boundaries.

Referring now to FIG. 1, an exemplary networked computer environment 100 in accordance with one embodiment is depicted. The networked computer environment 100 may include a computer 102 with a processor 104 and a data storage device 106 that is enabled to run a subsystem identification program 108A. The networked computer environment 100 may also include a server 112 that is enabled to run a subsystem identification program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively and client computer 102 may include internal components 800b and external components 900b, respectively. Client computer 102 may be, for example, a mobile device, a telephone, a PDA, a netbook, a laptop computer, a tablet computer, a desktop computer, or any type of computing device capable of running a program and accessing a network.

A program, such as a subsystem identification program 108A and 108B may run on the client computer 102 or on the server computer 112. The subsystem identification program 108A and 108B may be used to establish subsystem boundaries associated with an input program automatically. The subsystem identification program 108A and 108B is explained in further detail below with respect to FIG. 2.

Figure 2:
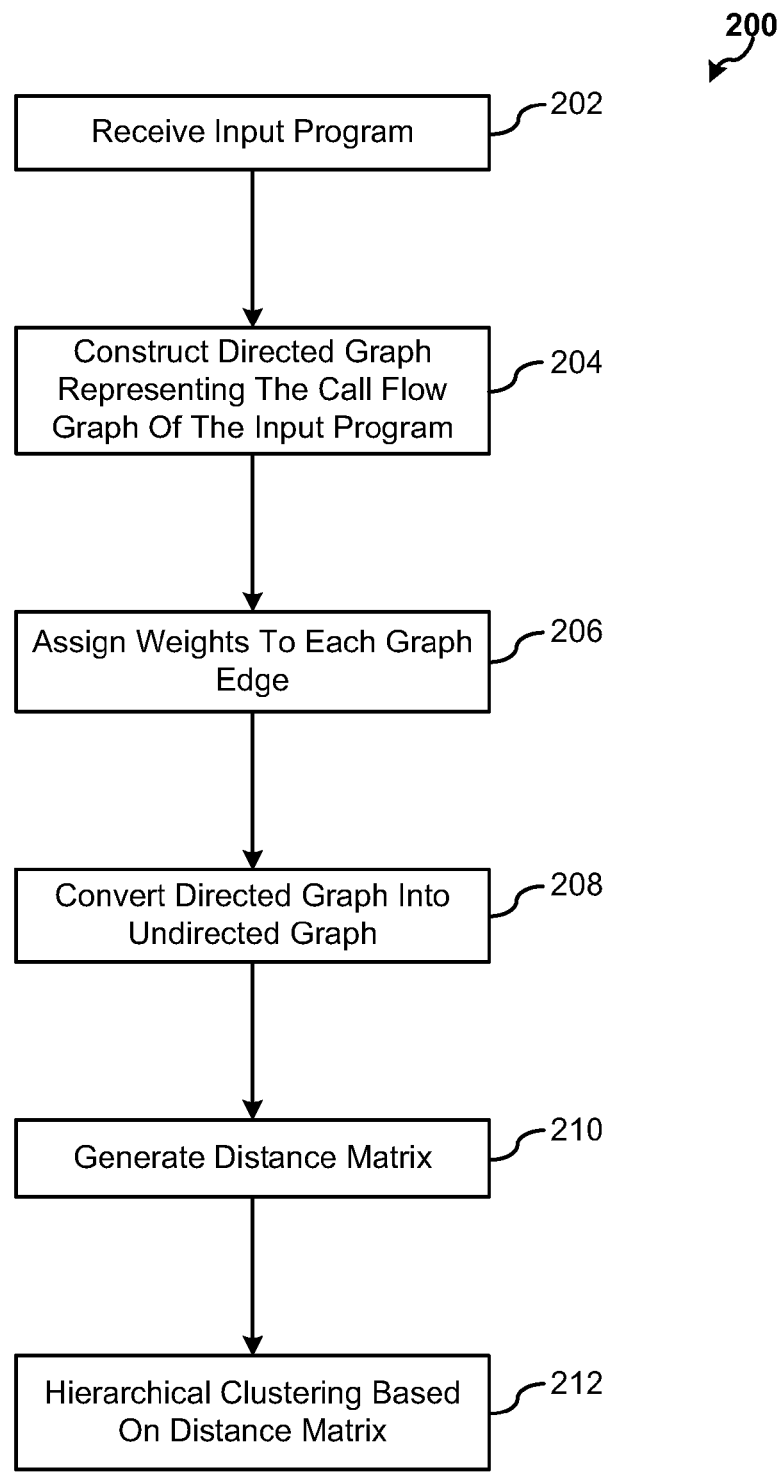
FIG. 2 is an operational flow chart illustrating an exemplary process for a subsystem identification program according to at least one embodiment.

Referring now to FIG. 2, an operational flow chart illustrating the exemplary process 200 by the subsystem identification program 108A and 108B (FIG. 1) according to at least one embodiment is depicted.

At 202, the process 200 may receive an input program to analyze to establish subsystem boundaries. According to at least one embodiment, the input program may be received as binary code (stripped or not stripped) or as source code. In instances where the input program supplied may be stripped binary code (i.e., binary code that has any subroutine identification information removed), a symbol table associated with the input program may be used to identify subroutines.

Next, at 204, the input program may be analyzed to construct a directed graph that may represent a call flow graph (i.e., a graph depicting program subroutines and calls between subroutines). According to at least one embodiment, the directed graph may be constructed by first identifying subroutines in the input program. Subroutines may be represented by nodes in the directed graph. Calls from one subroutine to another subroutine (i.e., inter-subroutine calls) may be represented by edges in the directed graph connecting the two nodes corresponding to the two subroutines involved in the inter-subroutine call. For example, an input program may have subroutines A, B, and C where subroutine A may call C, C may call A, A may call B, and B may call C. Edge direction in the list representing the directed graph may be from caller subroutine (i.e., subroutines that initiate the subroutine call) to called subroutine (i.e., subroutines that receive the subroutine call). The directed graph illustrating the above example may be implemented as a list with an entry for each caller subroutine, wherein each caller subroutine entry lists the one or more called subroutines called by the caller subroutine (e.g., A [B, C]; B [C]; C [A]).

Then, at 206, each edge in the directed graph may be assigned an edge weight. According to at least one implementation, edge weight may be calculated according to the following formula:

$$\text{Edge Weight} = 2^{(\text{incoming\_edges} - 1)}$$

Where the incoming_edges value corresponds with the number of incoming edges to a node (i.e., the number of different caller subroutines calling the called subroutine the node represents). For example, the edge weight for each incoming edge to a node with six incoming edges would be 32 (i.e., $2^{(6-1)} = 2^5 = 32$). The edge weight may act as a dissimilarity metric in which called subroutines with numerous callers are considered to be very dissimilar from the calling subroutines and as such may be treated as subsystem gateways (i.e., a single subroutine that regularly calls the other subroutines in the subsystem) that may indicate subsystem boundaries.

Additionally, according to at least one implementation, subroutines that have no incoming edges (i.e., an entry node) may be treated as a special case. Entry nodes may have any outgoing edges weighted heavily so that entry points into the program do not affect the connectivity of the subsystems that the entry nodes may use. For example, if an entry node has been identified, the entry node's outgoing edges may be weighted heavily by assigning a very large constant number or by calculating the maximum of all edge weights in the graph and making the entry node's outgoing edge weights greater than the calculated maximum edge weight in the graph.

At 208, the directed graph may be converted into an undirected graph. The directed graph may be converted into an undirected graph by removing the direction data associated with each edge. According to at least one embodiment, a directed graph may have direction data associated with each edge removed by adding links in the graph from called subroutines back to caller subroutines in instances where such link may not already be present. For example, directed graph DG (e.g., A [B, C]; B [C]; C [A]) may become undirected graph UG (e.g., A [B, C]; B [A, C]; C [A, B]) after additional links linking called subroutines to caller subroutines are added.

Next, at 210, a distance matrix may be generated. The distance matrix may be generated by assessing the distance between each pair of nodes in the graph. The nodes in the graph may not be fully connected, resulting in some distances between nodes that may be infinite. According to at least one embodiment, a distance matrix may be generated that associates a distance value with each node pairing in the graph where the distance value comprises the sum (i.e., aggregate) of the edge weights along the shortest edge path between two nodes.

The edge path between two nodes in the graph may comprise a single edge connecting the two nodes, or if the two nodes are not connected by a single edge, the edge path may include multiple edges and nodes that together form an uninterrupted connection (i.e., the combined edges and nodes may be equivalent to a single edge) between the two nodes. For example, a graph may have three nodes (A, B, and C) and two edges, edge $E_{AB}$ and edge $E_{BC}$ having edge weights of 20 and 12 respectively. The edge path between node A and node C would comprise edges $E_{AB}$ and $E_{BC}$ wherein the distance value associated with node A and C would be 32 (i.e., the sum of the edge weights of $E_{AB}$ and $E_{BC}$, or the sum of 20 and 12). The undirected graph and edge weight data may be used to determine the shortest edge path between two nodes in the graph in instances where there may be more than one possible edge path between two nodes.

A distance matrix may then be generated, for example, from a graph having three nodes (A, B, and C). The generated distance matrix for a graph having three nodes may result in a three by three matrix comprising three rows and three columns (i.e., one row per node and one column per node). At the intersection of each row and column may be a value corresponding to the distance value associated with the node corresponding to the row and the node corresponding to the column. For instance, if the distance between node A and node C is 32, the value in the matrix at the intersection of row A and column C may be 32 and the same value may be at the intersection of row C and column A.

Then, at 212, nodes in the graph may be hierarchically clustered based on the distance matrix. According to at least one embodiment, hierarchical clustering may begin by searching the distance matrix for the two closest nodes (i.e., lowest distance value in the matrix) and pairing the two nodes with the lowest associated distance value together (e.g., nodes [A] and [B]). The newly paired nodes may then be replaced in the distance matrix with a single new clustered node (i.e., composite node) that represents both nodes (e.g., node [A+B]). The distances between the new clustered node and the remaining nodes in the graph may then be updated. The distances between the clustered node and other nodes in the graph may be updated by using the minimum distance between any of the nodes contained in the clustered node and each remaining node in the distance matrix. The hierarchical clustering process may iteratively continue wherein the two closest nodes (including any clustered node created last iteration) may again be paired to form another clustered node (e.g., node [D] and node [A+B] may become node [D+A+B]).

It may be appreciated that FIG. 2 provides only an illustration of one implementation and does not imply any limitations with regard to how different embodiments may be implemented. Many modifications to the depicted embodiment may be made based on design and implementation requirements. For example, according to at least one embodiment, the hierarchical clustering process may continue to run iterations until the shortest distance value associated with any two nodes in the distance matrix exceeds a maximum distance value. If the maximum distance value is predefined at ten, hierarchical clustering iterations may stop when the distance value associated with the two closest nodes in the distance matrix is more than ten. Once hierarchical clustering is complete, the remaining nodes (i.e., clustered nodes and unclustered nodes) in the distance matrix may represent clusters of subroutines that correspond with putative subsystems.

According to at least one other embodiment, a dendrogram may be generated during hierarchical clustering, wherein the hierarchical clustering may be allowed to continue iterating to completion (i.e., until only one node in the distance matrix remains comprising all nodes in the graph). The dendrogram representation of the hierarchical clustering may then be cut at a specified distance value (i.e., the maximum distance value) wherein the resulting clusters of nodes representing subroutines after cutting the dendrogram may correspond with putative subsystems.

Figure 3:
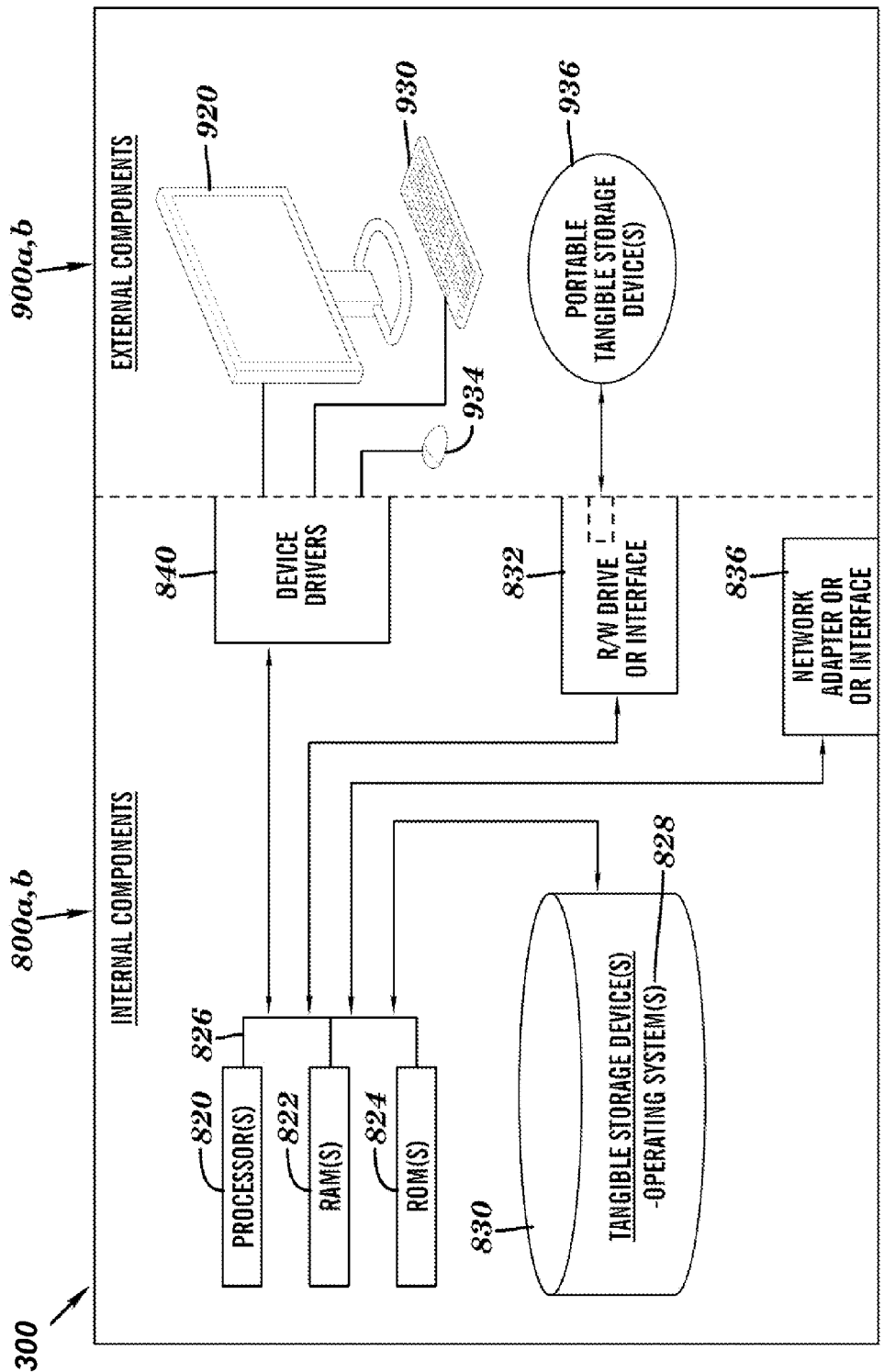
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 3. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as a subsystem identification program 108A and 108B (FIG. 1) corresponding to process 200 (FIG. 2), may be stored on one or more computer-readable tangible storage devices 830 for execution by one or more processors 820 via one or more RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. The subsystem identification program 108A and 108B (FIG. 1) can be stored on one or more of the respective portable computer-readable tangible storage devices 936, read via the respective R/W drive or interface 832 and loaded into the respective hard drive 830.

Each set of internal components 800 a, b may also include network adapters (or switch port cards) or interfaces 836 such as a TCP/IP adapter cards, wireless wi-fi interface cards, or 3G or 4G wireless interface cards or other wired or wireless communication links. The subsystem identification program 108A (FIG. 1) in client computer 102 (FIG. 1) and the subsystem identification program 108B (FIG. 1) in network server computer 112 (FIG. 1) can be downloaded from an external computer (e.g., server) via a network (for example, the Internet, a local area network or other, wide area network) and respective network adapters or interfaces 836. From the network adapters (or switch port adaptors) or interfaces 836, the subsystem identification program 108A (FIG. 1) in client computer 102 (FIG. 1) and the subsystem identification program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for establishing subsystem boundaries associated with a program, comprising:
    receiving an input program having a plurality of subroutines and at least one inter-subroutine call;
    generating a graph having a plurality of nodes and at least one edge connecting two nodes within the plurality of nodes, wherein each node within the plurality of nodes corresponds with each subroutine within the plurality of subroutines and the at least one edge corresponds with the at least one inter-subroutine call, and wherein the at least one edge includes a first end connected to a first node within the plurality of nodes and a second end connected to a second node within the plurality of nodes;
    assigning an edge weight to the at least one edge, wherein the edge weight is based on a number of second ends received by the second node within the plurality of nodes;
    determining, based on the assigned edge weight, a distance value between each pair of nodes within the plurality of nodes in the generated graph;
    generating a distance matrix based on the plurality of nodes and the determined distance value between each pair of nodes within the plurality of nodes; and
    generating a grouping of nodes based on the determined distance value between each pair of nodes within the plurality of nodes by iteratively identifying a pair of nodes in the distance matrix that have a lowest associated distance value, and terminating iterations when the lowest associated distance value between the pair of nodes in the distance matrix exceeds a maximum distance value.

2. The method of claim 1, wherein the first node within the plurality of nodes corresponds with a subroutine within the plurality of subroutines that initiates the at least one inter-subroutine call.

3. The method of claim 1, wherein the second node within the plurality of nodes corresponds with a subroutine within the plurality of subroutines that receives the at least one inter-subroutine call.

4. The method of claim 1, wherein determining, based on the assigned edge weight, the distance value between each pair of nodes within the plurality of nodes comprises a sum of edge weights for the at least one edge in a path between each pair of nodes within the plurality of nodes.

5. The method of claim 1, wherein generating the grouping of nodes based on the determined distance value between each pair of nodes within the plurality of nodes further comprises:
    creating a composite node that corresponds to the identified pair of nodes in the distance matrix, and replacing the identified pair of nodes in the distance matrix with the composite node.

6. A computer system for establishing subsystem boundaries associated with a program, comprising:
    one or more processors, one or more memories, one or more computer-readable storage media, and program instructions stored on at least one of the one or more computer-readable storage media for execution by at least one of the one or more processors via at least one of the one or more memories, wherein the computer system is capable of performing a method comprising:
    receiving an input program having a plurality of subroutines and at least one inter-subroutine call;
    generating a graph having a plurality of nodes and at least one edge connecting two nodes within the plurality of nodes, wherein each node within the plurality of nodes corresponds with each subroutine within the plurality of subroutines and the at least one edge corresponds with the at least one inter-subroutine call, and wherein the at least one edge includes a first end connected to a first node within the plurality of nodes and a second end connected to a second node within the plurality of nodes;
    assigning an edge weight to the at least one edge, wherein the edge weight is based on a number of second ends received by the second node within the plurality of nodes;
    determining, based on the assigned edge weight, a distance value between each pair of nodes within the plurality of nodes in the generated graph;
    generating a distance matrix based on the plurality of nodes and the determined distance value between each pair of nodes within the plurality of nodes; and
    generating a grouping of nodes based on the determined distance value between each pair of nodes within the plurality of nodes by iteratively identifying a pair of nodes in the distance matrix that have a lowest associated distance value, and terminating iterations when the lowest associated distance value between the pair of nodes in the distance matrix exceeds a maximum distance value.

7. The computer system of claim 6, wherein the first node within the plurality of nodes corresponds with a subroutine within the plurality of subroutines that initiates the at least one inter-subroutine call.

8. The computer system of claim 6, wherein the second node within the plurality of nodes corresponds with a subroutine within the plurality of subroutines that receives the at least one inter-subroutine call.

9. The computer system of claim 6, wherein determining, based on the assigned edge weight, the distance value between each pair of nodes within the plurality of nodes comprises a sum of edge weights for the at least one edge in a path between each pair of nodes within the plurality of nodes.

10. The computer system of claim 6, wherein generating the grouping of nodes based on the determined distance value between each pair of nodes within the plurality of nodes further comprises:
   creating a composite node that corresponds to the identified pair of nodes in the distance matrix, and replacing the identified pair of nodes in the distance matrix with the composite node.

11. A computer program product for establishing subsystem boundaries associated with a program, comprising:
   one or more computer-readable storage media and program instructions stored on at least one of the one or more computer-readable storage media, the program instructions executable by a processor, the program instructions comprising:
   program instructions to receive an input program having a plurality of subroutines and at least one inter-subroutine call;
   program instructions to generate a graph having a plurality of nodes and at least one edge connecting two nodes within the plurality of nodes, wherein each node within the plurality of nodes corresponds with each subroutine within the plurality of subroutines and the at least one edge corresponds with the at least one inter-subroutine call, and wherein the at least one edge includes a first end connected to a first node within the plurality of nodes and a second end connected to a second node within the plurality of nodes;
   program instructions to assign an edge weight to the at least one edge, wherein the edge weight is based on a number of second ends received by the second node within the plurality of nodes;
   program instructions to determine, based on the assigned edge weight, a distance value between each pair of nodes within the plurality of nodes in the generated graph;
   program instructions to generate a distance matrix based on the plurality of nodes and the determined distance value between each pair of nodes within the plurality of nodes; and
   program instructions to generate a grouping of nodes based on the determined distance value between each pair of nodes within the plurality of nodes by iteratively identifying a pair of nodes in the distance matrix that have a lowest associated distance value, and terminating iterations when the lowest associated distance value between the pair of nodes in the distance matrix exceeds a maximum distance value.

12. The computer program product of claim 11, wherein the first node within the plurality of nodes corresponds with a subroutine within the plurality of subroutines that initiates the at least one inter-subroutine call.

13. The computer program product of claim 11, wherein the second node within the plurality of nodes corresponds with a subroutine within the plurality of subroutines that receives the at least one inter-subroutine call.

14. The computer program product of claim 11, wherein program instructions to determine, based on the assigned edge weight, the distance value between each pair of nodes within the plurality of nodes comprises a sum of edge weights for the at least one edge in a path between each pair of nodes within the plurality of nodes.

15. The computer program product of claim 11, wherein program instructions to generate the grouping of nodes based on the determined distance value between each pair of nodes within the plurality of nodes further comprises:
   creating a composite node that corresponds to the identified pair of nodes in the distance matrix, and replacing the identified pair of nodes in the distance matrix with the composite node.

* * * * *